US009910653B2

(12) United States Patent
Holm et al.

(10) Patent No.: US 9,910,653 B2
(45) Date of Patent: Mar. 6, 2018

(54) SOFTWARE DISTRIBUTION

(75) Inventors: Jukka Holm, Tampere (FI); Pauli Laine, Espoo (FI); Charlie Schick, Espoo (FI); Olavi Toivainen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 2429 days.

(21) Appl. No.: 10/514,062

(22) PCT Filed: Feb. 7, 2003

(86) PCT No.: PCT/IB03/00458
§ 371 (c)(1),
(2), (4) Date: May 5, 2005

(87) PCT Pub. No.: WO2004/070589
PCT Pub. Date: Aug. 19, 2004

(65) Prior Publication Data
US 2006/0143129 A1 Jun. 29, 2006

(51) Int. Cl.
*G06F 9/445* (2006.01)
*G06F 21/10* (2013.01)
(52) U.S. Cl.
CPC .............. *G06F 8/61* (2013.01); *G06F 21/10* (2013.01); *G06F 2221/0704* (2013.01); *G06F 2221/0744* (2013.01); *G06F 2221/2145* (2013.01)
(58) Field of Classification Search
CPC ........................................................ G06F 8/61
USPC ............................................................ 705/51
See application file for complete search history.

(56) References Cited

U.S. PATENT DOCUMENTS 5,495,411 A * 2/1996 Ananda ................. G06F 21/125
705/32
5,586,323 A * 12/1996 Koizumi ................ G06F 8/447
714/E11.209
5,721,824 A * 2/1998 Taylor ........................ G06F 8/61
709/203

(Continued)

FOREIGN PATENT DOCUMENTS

DE          10119493 A1     10/2001
JP          2000-122954      4/2000

(Continued)

*Primary Examiner* — Steven S Kim
(74) *Attorney, Agent, or Firm* — Ditthavong & Steiner, P.C.

(57) ABSTRACT

An electronic device comprising: receiving means for receiving a first packaged installation file; installation means for installing a first version of a software application using the received first packaged installation file; packaging means for creating a second packaged installation file, for installing a second version of the software application; and transfer means for transferring the second packaged installation file to a second host device. A hand-portable electronic device, for sending data to another device during a session to enable the interactive production of music by the devices as an ensemble, comprising: output means operable, during a session, to send musical synchronisation information to the other device; a user input for controlling, during a session, the content of at least one of first musical control data and musical synchronisation information; and a synthesiser for producing music in dependence upon the first musical control data and the musical synchronisation information.

20 Claims, 3 Drawing Sheets

(56) References Cited

U.S. PATENT DOCUMENTS

| | | | |
|---|---|---|---|
| 5,892,900 A * | 4/1999 | Ginter et al. | 726/26 |
| 5,931,909 A * | 8/1999 | Taylor | G06F 8/61 709/221 |
| 6,108,420 A | 8/2000 | Larose et al. | 380/4 |
| 6,117,187 A * | 9/2000 | Staelin | 717/169 |
| 6,131,192 A * | 10/2000 | Henry | G06F 8/61 707/999.101 |
| 6,675,382 B1 * | 1/2004 | Foster | G06F 8/61 707/999.001 |
| 6,699,125 B2 * | 3/2004 | Kirmse et al. | 463/42 |
| 6,748,537 B2 * | 6/2004 | Hughes | 713/193 |
| 7,803,052 B2 * | 9/2010 | Multerer et al. | 463/42 |
| 2001/0039212 A1 * | 11/2001 | Sawano et al. | 463/43 |
| 2002/0083003 A1 * | 6/2002 | Halliday | G06Q 30/04 705/52 |
| 2002/0086732 A1 * | 7/2002 | Kirmse | A63F 13/12 463/42 |
| 2002/0114455 A1 | 8/2002 | Asahi | 380/201 |
| 2003/0018964 A1 * | 1/2003 | Fox | G06F 8/61 717/177 |
| 2003/0044020 A1 * | 3/2003 | Aboba et al. | 380/278 |
| 2003/0145318 A1 * | 7/2003 | Mont | G06F 8/61 717/178 |
| 2004/0044739 A1 * | 3/2004 | Ziegler | G06Q 20/02 709/213 |
| 2004/0176025 A1 * | 9/2004 | Holm | G10H 1/0066 455/3.06 |

FOREIGN PATENT DOCUMENTS

| | | |
|---|---|---|
| JP | 2002-132736 | 5/2002 |
| JP | 2002-244929 | 8/2002 |
| JP | 2002-351744 | 12/2002 |
| WO | WO-02/054194 A2 | 7/2002 |

\* cited by examiner

SOFTWARE DISTRIBUTION

TECHNICAL FIELD & BACKGROUND OF THE INVENTION

Embodiments of the present invention relate to the distribution of software applications.

It would be desirable to be able to distribute a software application by transferring it from a device in which it is installed to another device in a simple and effective manner.

It would also be desirable to allow the originator of the software application to control the distribution process.

BRIEF SUMMARY OF THE INVENTION

According to a first aspect of the present invention there is provided an electronic device comprising: installation means (12) for installing a first version (5a) of a software application using a first installation file (10a); and transfer means (16) for transferring a second installation file associated with the first installation file to a second host device (2a, 2b . . . ) for installing a second version of the software application in the second host device. The second version may have reduced functionality, such as restricted use. The functionality may be predetermined by the content of first installation file. The second version of the software application installed in second host device may operate only with the first version of the software application installed in the first host device. The device may additionally comprise packaging means (12) for creating the second installation file (10b).

According to a second aspect of the present invention there is provided a method of sharing a software application comprising the steps of: installing a first version (5a) of a software application using a first installation file (10a); and transferring a second installation file (10b), for installing a second version (5b) of the software application, to a second host device (2a, 2b . . . ). 20.

According to a third aspect of the present invention there is provided a first installation file (10a) comprising: means for providing an installed first version (5a) of a software application in a first host device (1); means for enabling the first host device (1) to transfer a second installation file (10b) to a second host device (2a, 2b . . . ), the second installation file including means for providing an installed second version (5b) of the software application in the second host device (2a, 2b . . . ).

According to a further aspect of the present invention there is provided a hand-portable electronic device, for sending data to another device during a session to enable the interactive production of music by the devices as an ensemble, comprising: output means operable, during a session, to send musical synchronisation information to the other device; a user input for controlling, during a session, the content of at least one of first musical control data and musical synchronisation information; and a synthesiser for producing music in dependence upon the first musical control data and the musical synchronisation information. The output means may be operable, before a session, to transfer a software application to the other device for enabling the production of music in dependence upon second musical control data and synchronisation information.

According to a further aspect of the present invention there is provided a method of interactively producing music using an ensemble of networked hand-portable electronic devices Including a Master device and at least one Slave device, comprising the steps of: sending musical synchronisation information from the Master device to the Slave device(s); producing, at each device, musical control data in response to user input at the device; synthesising music at each device in dependence upon the musical control data produced therein and the musical synchronisation information.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

Figure 1:
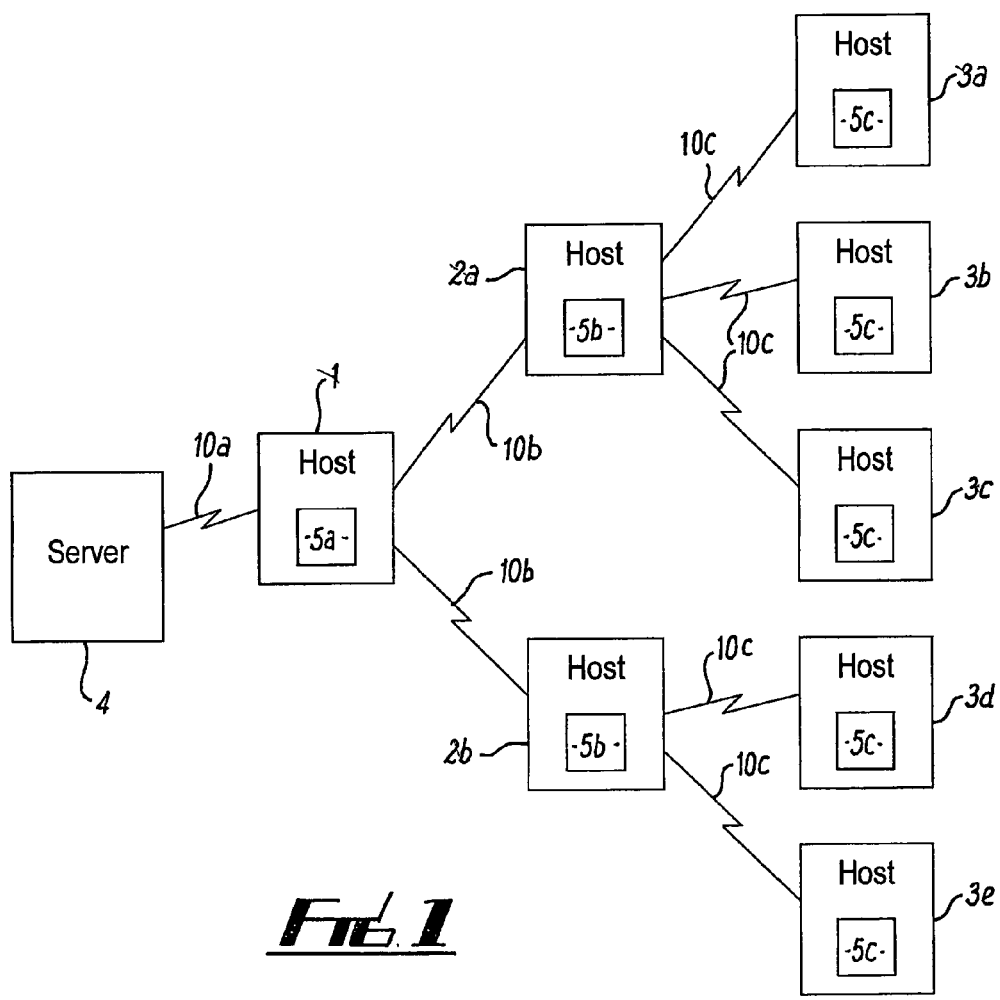
FIG. 1 illustrates the distribution of a software application.

FIG. 1 illustrates one way of distributing a software application. A first host device 1 has received a first installation file 10a. In this example, the host device 1 is a computer device and it has downloaded the first installation file 10a from a server 4. In other embodiments, the first installation file may be provided on a portable memory, such as a memory card, that can be read by the host device.

The first installation file 10a provides an installed first version 5a of the software application in the first host device 1. It also enables the first host device 1 to transfer a second installation file 10b to one or more second host devices 2a, 2b . . .

The second Installation file 10b provides an installed second version 5b of the software application in each of the second host devices 2a, 2b. It also enables each of the second host devices 2a, 2b to transfer a third installation file 10c to one or more third host devices 3a, 3b, 3c . . . . The third installation file 10c provides an installed third version 5c of the software application in each of the third host devices 3a, 3b. The distribution of the software application can continue to more host devices. Thus versions of the software can be distributed 'virally'.

In a first embodiment, the first version 5a is a fully functional version of the software application that has, for example, been purchased by a user of the first host device 1 and the second and third versions 5b, 5c are both a 'demonstration' version of the software application that has reduced functionality. The creator of the first packaged installation file 10a has designed the first installation file 10a so that it distributes a non-exact copy of itself as the second installation file 10b. The second installation file 10b can distribute an exact copy of itself (a non-exact copy of the first installation file 10a) as the third installation file 10c.

Alternatively, in a second embodiment, all the versions 5a, 5b, 5c of the software application could be fully functional versions of the software application. In this case, the creator of the first packaged installation file 10a has designed the first packaged installation file 10a so that it distributes an exact copy of itself as the second installation file 10b.

Figure 2:
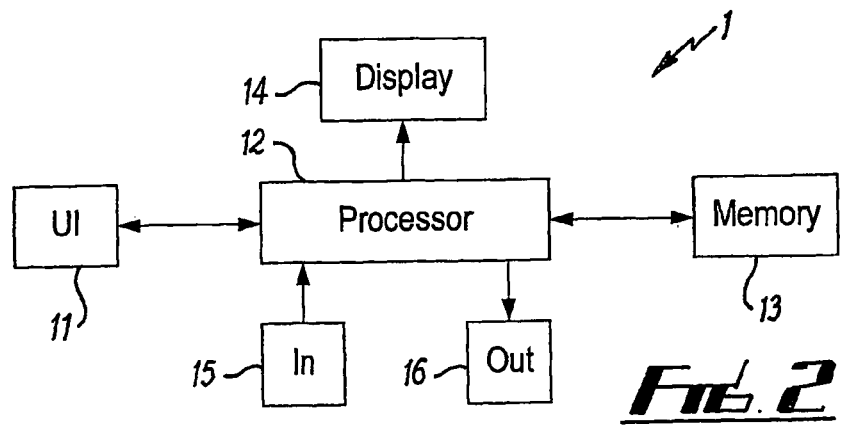
FIG. 2 schematically illustrates a suitable host device.

FIG. 2 schematically illustrates a suitable host device 1. It has a user input interface (UI) 11, a processor 12, a memory 13, a display 14, an input 15 for receiving data and an output 16 for transmitting data. The user input interface 11 is connected to the processor 12 and allows a user of the device 1 to control the operation of the device via the processor 12. The processor 12 is connected to the input 15 and the output 16. It is operable to receive and process data received via the input 15 and to provide data to the output 16 for transmission. The processor 12 is connected to the memory 13 and is operable to read from and write to the memory 13. The processor 12 is also operable to control the display 14. In other embodiments, the display and user input interface may be combined. The input 15 and output 16 may be a radio frequency receiver and transmitter respectively, alternatively they may be part of a single physical interface (e.g. USB port).

An installation file 10 can be received via input 15 and stored in memory 13 by the processor 12. The installation file 10 is used by the processor 12 to install a software application in the device 1. The installation file also enables the processor 12 to transfer another installation file to one or more other devices via the output 16. The first installation file 10a may contain the second installation file 10b. The file may contain the first full version and a separate second demo version. The second version of the software application provided by the second installation file 10b has reduced functionality compared to the first version. In one embodiment, the use of the second version of the software application is restricted. It operates correctly only when it is in communication with the first device. The different functionality of the second version is predetermined by the content of first installation file.

Alternatively, the first installation file 10a may contain a mechanism for creating the second installation file 10b from the installed first version 5a of the software application. This mechanism can be pre-programmed within the content of the first installation file 10a such that the relationship of the versions of the software to each other is predetermined. The first and second installation files may thus be packaged installation files.

Figure 3:
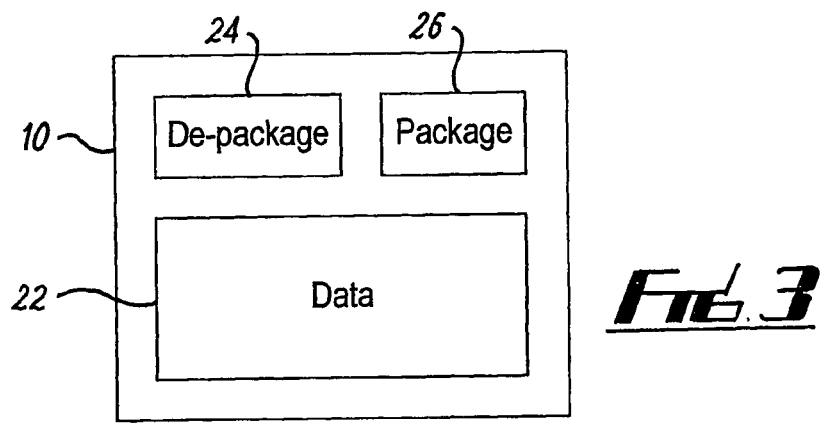
FIG. 3 schematically illustrates one possible type of packaged installation file.

FIG. 3 schematically illustrates one possible type of packaged installation file 10 containing a data portion 22; a de-packaging portion 24 and a re-packaging portion 26. The portions are not necessarily physically distinct or separately identifiable. They represent the different purposes of the content of the packaged installation file 10. The packaged installation file may be in a compressed format.

The data portion 22, in this example, includes all the information necessary to enable a software application in a device once it has been installed.

The de-packaging portion 26 contains installation information that specifies the manner in which the data portion should be installed. e.g. it may specify a predetermined data structure involving the creation of new directories, sub-directories and files.

The re-packaging portion 26 specifies how a packaged installation file is created, at a later time, from the installed version of the software application for transfer to another device.

The packaged installation files may for example, be compressed Symbian Installation File which have a MIME extension ".sis".

Figure 4A:
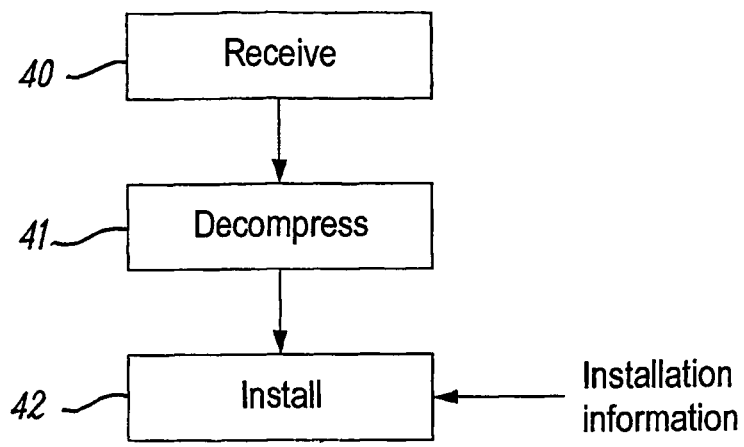
FIG. 4A illustrates the installation process.

The installation process using a packaged installation file is illustrated in FIG. 4A. A packaged installation file 10, for setting-up a software application, is received at the input 15 of the host device 1 at step 40. The file 10 is decompressed at step 41 by the processor 12 and temporarily stored in memory 13. The software application is then installed at step 42 by the processor 12 according to installation information read from the de-packaging portion 24. The necessary new directories, sub-directories and files are created as specified in the installation information by the processor 12. The installation information is stored as part of the packaging portion 26 and is accessible only to the installed software application.

The re-packaging portion 26 of the packaged installation file provides a user selectable option in the user input interface 11 of the installed software application for distributing a version of the software application to another host device.

Figure 4B:
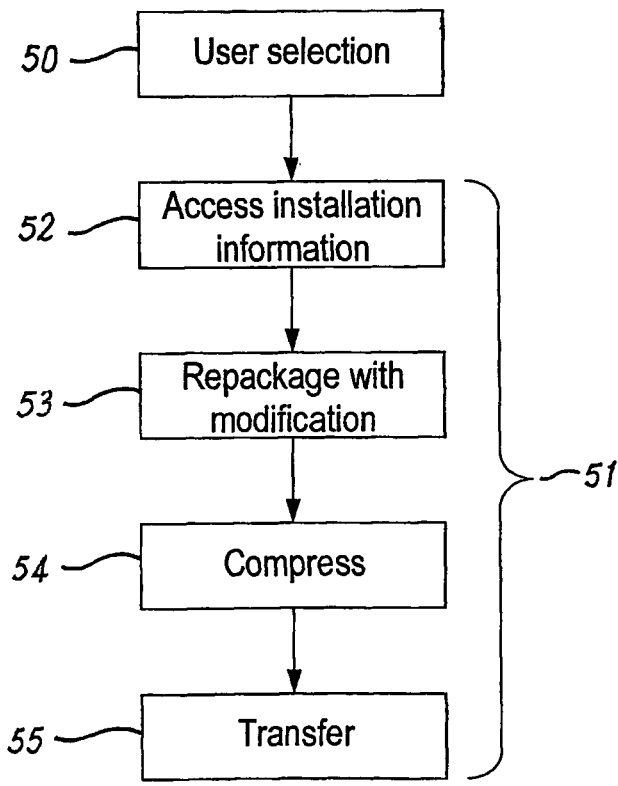
FIG. 4B illustrates the re-packaging process.

The distribution process that is carried out by the processor 12 if the option is selected is illustrated in FIG. 4B. The user selects at step 50, via UI 11, the option for distributing a version of the software application from within the software application. This activates the repackaging process 51 in the processor 12, which is the reverse of the installation process. However, certain functionality may additionally be included or excluded/disabled in the repackaged file.

The processor 12 of the host device accesses 52 the installation information for the installed software application from the re-packaging portion 26, which details which files were created at installation.

The processor 12 repackages copies of the files, with modification if necessary at step 53 compresses them, at step 54, and then transfers them, at step 55, as a packaged installation file to another device. This packaged installation file 10 also has a data portion 22, a de-packaging portion 24 and a re-packaging portion 26.

Whether modification is necessary and the extent of modification is predetermined by the content of the re-packaging portion 26 of the received packaged installation file. Thus the creator of the original first packaged installation file can control the manner in which versions of the software can be distributed.

For example, the re-packaging portion 26 may specify that certain files should not be included in the repackaged installation file. This would result in the version of the software application installed in a device that receives this repackaged installation file being of reduced functionality.

Another option is to define a flag in the original repackaged installation file that indicates whether the version is an original. The repackaging portion 26 switches the flag, which because of some code within the software application itself reduces its functionality.

A further option is to include an identifier of the first host device in the second packaged installation file, so that the second version of the software in the second device will only operate when the second device is in communication with the first device.

Midi Jamming

The above described method of distributing a software application using an installation file has numerous applications.

In one application, the host device is capable of synthesising music and the synthesised musical output can be controlled interactively.

Figure 5:
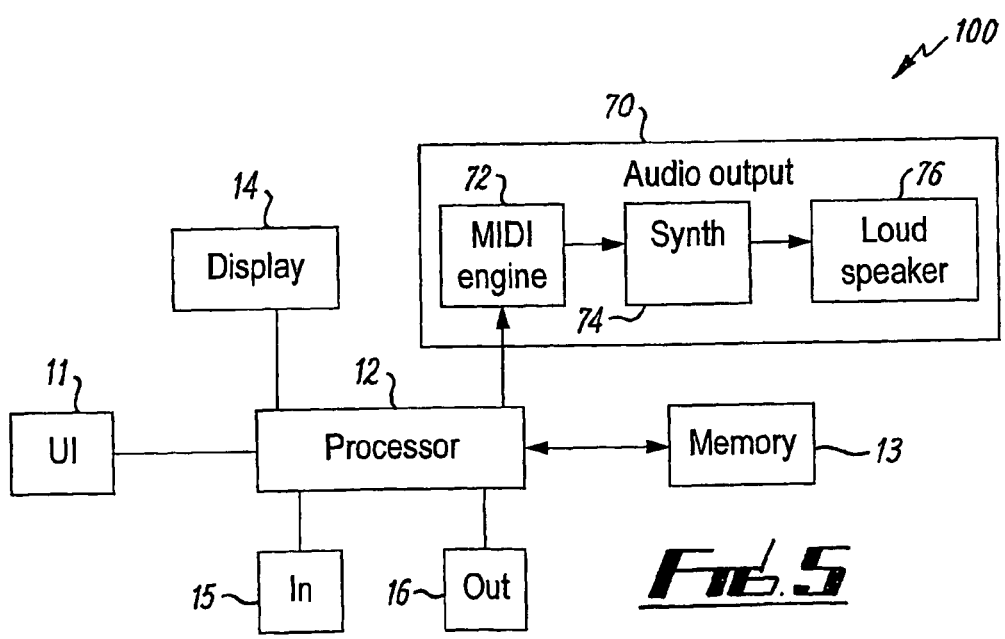
FIG. 5, illustrates a musical host device.

FIG. 5 illustrates one such host device 100. It is the same as the host device 1 in FIG. 2, but additionally has an audio output section 70 that may be similar to a sound card of a personal computer. It comprises a MIDI engine 72, which is connected to a MIDI synthesizer 74, which is in turn connected to a loudspeaker 76 (or other audio output such as a jack or Bluetooth transceiver for a headset). The MIDI engine 72 provides a MIDI data stream in real time (as it is played) to the MIDI synthesizer 74. The MIDI data stream may include content from a MIDI file transferred to the MIDI engine 72 by the processor 12, it may also include additional or replacement messages introduced by the MIDI engine 72 under the control of the processor 12.

The MIDI synthesizer 32 receives the MIDI messages one at a time and responds to these messages by playing sounds via the loudspeaker 34. The MIDI messages are received and processed by the MIDI synthesizer in real time.

The host device may perform solo or in an ensemble of devices which form a network. When the device performs solo, the user of the device controls any variation in the musical output from that device using the UI 11.

When the devices perform in an ensemble the musical output of the ensemble is the combination of the musical output of each device. The user of a device may control a variation in the musical output of the ensemble by controlling the musical output of their own device and the output of each of the other devices in the network. This allows interactive composition of music by multiple users who are preferably face-to-face.

The synthesised musical output can be controlled in a number of ways to provide an improvised composition.

For example, the user of the host device 100 can perform melodies, rhythms, loops etc in real-time using the terminal's UI 11 (e.g. a keypad or other MIDI controllers such as an integrated accelerometer that responds to moving the device). These may be performed with or without background music. A mobile phone with accelerometer could be shaken while a background samba track is performed with the phone creating percussion in time with the shaking. The background music can be produced by transferring a stored MIDI file to the MIDI engine 72, by the processor. The accompanying percussion is added as additional MIDI messages in the output of the MIDI engine. A plurality of phones can be networked, for example using Bluetooth, and each phone user can make a percussive contribution to the ensemble's performance with the backing track.

As another example, a background track can be varied in real time by adding effects (echo, reverberation etc), changing the musical arrangement, performing 'live' over the background track, removing instrumentation such as the drum beat, or removing melodies, bass line etc. These affects can be achieved by changing the MIDI messages output by the MIDI engine 72.

As another example, separate musical tracks may be mixed together interactively. This can be achieved via the MIDI engine 72.

The interactive musical control is achieved using multiple musical applications.

One type of musical application allows one or more musical effect to be created and changed in real-time e.g. echo, reverberation etc. Another type of musical application provides the voice of a particular instrument.

A musical application can be used in an Independent 'Freestyle' Mode, in a Slave 'Assisted' Mode or in a Master Mode.

A session is an ensemble of musical applications. In any session there will only be one Master Application. The session may involve one device or a plurality of networked devices.

The user may select which of the possible musical applications are active and which mode they have. Some musical applications may have a fixed mode type.

In the independent Mode the application is played much like a traditional instrument. The output depends solely on the talent of the user with the available user input interface.

In the Master Mode, the musical application is responsible for the synchronisation of the ensemble of Slave musical applications. The master provides musical synchronisation information to each Slave musical application. This information may define a tempo or a harmony (chord sequence). When a tempo is defined, the Slave applications vary their timing to match the Master application continuously. This may be achieved in the Slave by varying the output of the MIDI engine 72 using the processor 12. The time at which a note is turn on or off is easily varied. A suitable Master application would be a drum beat application. Thus the music output at a Slave is dependent upon the musical synchronisation information received from the Master.

The synchronisation information may also define important musical features or changes to these features that are shared by musical applications or devices such as the identities of the musical applications being used in the ensemble, the background track, relative volumes, musical key, time signature or the energy of the music. These may be selected by the user of the device hosting the master musical application. A limited number of options for selection may be given for example, depending upon the backing track so that the possible variations of music produced have compatible variations of melody, bass and drums etc so that user cannot go too far wrong.

If a background track is used, it may be played as a MIDI file through the Master musical application. The users of the devices would therefore follow a predetermined lead.

In the Slave Mode, a musical application is synchronised to the Master musical application and the ensemble of Slave applications, in the same or separate devices, function as a single harmonious system.

The Slave musical application may operate in an assisted playing mode. In the assisted playing mode the output of the musical application is not an exact reproduction of the music created by the user. The musical output is automatically corrected/enhanced to ensure that the music produced adheres to certain principals. This is particularly useful for devices with input devices optimised for other purposes e.g. PDA, mobile phone. Consequently, no musical knowledge or training is required to perform music using the system.

For example, the user's timing may be automatically corrected to keep tempo. Automatic correction of the timing to keep tempo may be achieved by quantising the tempo, into possible beat positions. When the user, for example, makes an input to a drum beat application that does not have exactly the correct timing, the timing is adjusted to the nearest possible beat position. As another example, correct chords are generated, corrected or completed to keep harmony.

An ensemble of musical applications in a separate terminal can be created by forming a network between the terminals. The network can be established by any suitable connection e.g. infrared, internet, USB, GPRS, Bluetooth etc.

It is preferable for each device to have a copy of each musical application used in the ensemble, so that any device can synthesise sounds created using musical applications in other devices.

The musical applications can be distributed to devices using a packaged installation file as described above.

A MIDI Jamming single is a software application. It can be sold on memory cards or downloaded to a device over the air or via the internet as a packaged installation file e.g. a '.sis' file. A MIDI Jamming single when installed in a device allows the user of the device to participate is a musical session involving other devices.

A single software application consists of the following components: jamming framework software component; master musical application component; slave musical application components, a user interface component and a MIDI file component.

The jamming framework software allows a device to form a network with other devices and create an ensemble of musical applications. It also controls the creation, transmission, reception and use of synchronisation information.

The single software application may contain a pre-packaged installation file (e.g. '.sis') containing the above components in a packaged form. This packaged installation file can be transferred to another device for unpacking to install the single software application.

Alternatively, the single software application may have been installed from a packaged installation file (e.g. '.sis'). The device can therefore recreate a modified packaged installation file from the installed components using the installation information and provide this to another device. The other device installs the modified installation file to obtain a modified single software application, which cannot initiate Jamming sessions or perform solo but can be joined to a session.

The device that supplies the modified packaged installation file may also modify the file so that it includes its identifier. The modified software application installed from this file will only operate with a device having an identifier matching the included identifier. Consequently, the modified software application only works while the device from which it was obtained is present in the session.

In another application of the above described method of distributing a software application using an installation file, a multi-user game is purchased as a first packaged installation file stored in a memory card.

In one implementation, the memory card includes a full version of the game and also a related demo version of the game. These can be loaded into the first device in parallel. The full version is resident in the device, whereas the demo version can be transferred to other devices. The demo version may be designed so that it only functions correctly only when the device it has been transferred to is in communication with a full version of the game. The demo version may be designed so that it only functions correctly when the device it has been transferred to is in communication with its related full version of the game resident in the first device.

In another implementation, the installation file has, for example, a first component that allows a host device to start the game and join other devices to the game, a second component that allows a host device to be joined to a game and a third component allows the game to be played using the host device once it has been initiated by the first or second components. In the example of FIG. 1, the first device has a fully functional version of the game in which the first, second and third components are enabled. The second packaged installation file contains the second and third components but not the first component. The second version is therefore able to participate in a game when invited to join but cannot play the game by itself or cannot initiate a game.

Although embodiments of the present invention have been described in the preceding paragraphs with reference to various examples, it should be appreciated that modifications to the examples given can be made without departing from the scope of the invention as claimed.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method comprising:
   downloading, by a first user device, a first installation file from a server;
   installing, by the first user device, a first version of a software application thereon using the first installation file;
   generating, by the first user device, a second installation file by modifying the first installation file and including an identifier of the first user device into the second installation file;
   transferring, by the first user device, the second installation file via a network to a second user device;
   executing, by the first user device, the first version of the software application on the first user device;
   receiving, by the second user device, the second installation file via the network from the first user device;
   installing, by the second user device, a second version of the software application on the second user device using the second installation file;
   executing, by the second user device the second version of the software application on the second user device based on the identifier of the first user device during a communication connection of the first and second user devices;
   receiving, by the second device, an invitation to join the first version of the software application from the first user device; and
   interacting, by the second user device, with the first version of the software application operating on the first user device using the second version of the software application executing on the second user device.

2. The method as claimed in claim 1, wherein the software application is a game application, and the first installation file has a first component that supports the first user device to start the game application and join other user devices to a game in the game application, a second component that supports the first user device to be joined to the game, and a third component that supports the game to be played using the first user device once the game application has been initiated by the first component or the second component.

3. The method as claimed in claim 2, wherein the first version is a fully functional version of the game application that includes the first, second and third components.

4. The method as claimed in claim 3, wherein the second installation file includes the second and third components while excluding the first component.

5. The method as claimed in claim 4, wherein the second version is set to participate in a game when invited to join the game, but not to play the game by itself or initiate a game.

6. A system comprising:
   a first user device comprising a first processor and a second user device comprising a second processor,
   wherein the first user device is programmed to perform operation of:
     downloading a first installation file from a server,
     installing a first version of a software application on the first host device using the first installation file,
     generating a second installation file by modifying the first installation file and including an identifier of the first device into the second installation file, transferring the second installation file via a network to the second user device, executing the first version of the software application on the first user device, and inviting the second user device to join the first version of the software application on the first user device; and wherein the second user device is programmed to perform operations of:

receiving the second installation file via the network from the first user device, installing a second version of the software application on the second user device using the second installation file, executing the second version of the software application on the second user device based on the identifier of the first user device during a communication connection of the first and second user devices, receiving the invitation to join the first version of the software application from the first user device, and interacting with the first version of the software application operating on the first user device using the second version of the software application executing the second user device.

7. The system as claimed in claim 6, wherein the second version is a non-exact copy of the first version and has different functionality compared with the first version.

8. The system as claimed in claim 7, wherein the second version is a demonstration version of the software application and has reduced functionality.

9. The system as claimed in claim 8, wherein the second version has restricted use.

10. The system as claimed in claim 7, wherein the different functionality is predetermined by content of first installation file in accordance with an origination of the first installation file.

11. The system as claimed in claim 6, wherein the second version of the software application operates only with the first version of the software application installed in the first user device.

12. The system as claimed in claim 6, wherein the second installation file enables the second user device to transfer a third installation file to a third user device for installing the second version of the software application, and wherein the third installation file is an exact copy of the second installation file.

13. The system as claimed in claim 6, wherein the second installation file is a second packaged installation file, for installing the second version of the software application.

14. The system as claimed in claim 6, wherein the software application is a game application, and the first installation file has a first component that supports the first user device to start the game application and join other user devices to a game in the game application, a second component that supports the first user device to be joined to the game, and a third component that supports the game to be played using the first user device once the game application has been initiated by the first component or the second component.

15. The system as claimed in claim 14, wherein the first version is a fully functional version of the game application that includes the first, second and third components.

16. The system as claimed in claim 15, wherein the second installation file includes the second and third components while excluding the first component.

17. The system as claimed in claim 16, wherein the second version is set to participate in a game when invited to join the game, but not to play the game by itself or initiate a game.

18. The system as claimed in claim 6, wherein the first installation file is a packaged installation file that includes a data portion, a de-packaging portion, and a re-packaging portion.

19. The system as claimed in claim 6, wherein the second version of the software application is the same as the first version.

20. The system as claimed in claim 6, wherein the installation of the first version of the software application on the first user device and the installation of the second version of the software application on the second user device involve the creation of new directories, sub-directories and files on the first and second user devices, according to the instructions contained in the installation files.

* * * * *